United States Patent [19]
Ogasawara et al.

[11] Patent Number: 6,012,273
[45] Date of Patent: Jan. 11, 2000

[54] VERTICALLY MOVABLE GRASS CATCHER FOR A MOWER

[75] Inventors: Hiroyuki Ogasawara, Duluth, Ga.; Katsuhiko Uemura, Osaka, Japan; Masaki Hayashi, Osaka, Japan; Nobuyuki Yamashita, Osaka, Japan; Takashi Fujii, Osaka, Japan

[73] Assignee: Kubota Corporation, Japan

[21] Appl. No.: 09/086,089

[22] Filed: May 28, 1998

[30] Foreign Application Priority Data

Sep. 24, 1997 [JP] Japan ..................................... 9-258574

[51] Int. Cl.[7] ................................................. A01D 61/00
[52] U.S. Cl. ................................. 56/16.6; 56/202; 56/204; 56/205
[58] Field of Search ............................. 56/16.6, 202, 204, 56/205

[56] References Cited

U.S. PATENT DOCUMENTS

| | | | |
|---|---|---|---|
| 3,931,702 | 1/1976 | Soteropoulos et al. | 56/341 |
| 4,015,406 | 4/1977 | Witt et al. | 56/202 |
| 4,113,120 | 9/1978 | Pickrell | 214/28 D |
| 4,327,945 | 5/1982 | Fowler | 298/11 |
| 4,344,272 | 8/1982 | Gaudette et al. | 56/16.6 |
| 4,487,007 | 12/1984 | Mullet et al. | 56/16 |
| 4,573,742 | 3/1986 | Tegtmeier | 298/11 |
| 4,709,541 | 12/1987 | Broman et al. | 56/202 |
| 4,736,575 | 4/1988 | Fedeli | 56/202 |
| 4,984,420 | 1/1991 | Samejima | 56/203 |
| 5,018,346 | 5/1991 | Ishimaru et al. | 56/202 |
| 5,107,661 | 4/1992 | Shimamura | 56/202 |
| 5,473,871 | 12/1995 | Fava et al. | 56/16.6 |

FOREIGN PATENT DOCUMENTS

| | | | |
|---|---|---|---|
| 2746253 | 1/1996 | France | A01D 90/10 |
| 2223659 | 4/1990 | United Kingdom | 56/16.6 |

*Primary Examiner*—Thomas B. Will
*Assistant Examiner*—Arpad Fabian Kovacs
*Attorney, Agent, or Firm*—Webb Ziesenheim Logsdon Orkin & Hanson, P.C.

[57] ABSTRACT

A grass/lawn mower vehicle having a mower unit, and mechanism for transporting grass clippings cut by the mower unit through a suitable duct. The vehicle includes a grass catcher for collecting the grass clippings transported through the duct, a lid for opening and closing an opening of the grass catcher, a horizontal axis for connecting the grass catcher and the lid to be pivotable relative to each other, and a control mechanism for raising the grass catcher relative to the vehicle and swinging the grass catcher about the horizontal axis, thereby allowing the grass catcher to dump the grass clippings from an elevated position. The control mechanism includes a parallelogram link mechanism having one side thereof connected to the vehicle, and the other side connected to the lid, and an actuator for moving the link mechanism between a lower position and an upper position, and swinging the grass catcher when the link mechanism is in the upper position.

9 Claims, 6 Drawing Sheets

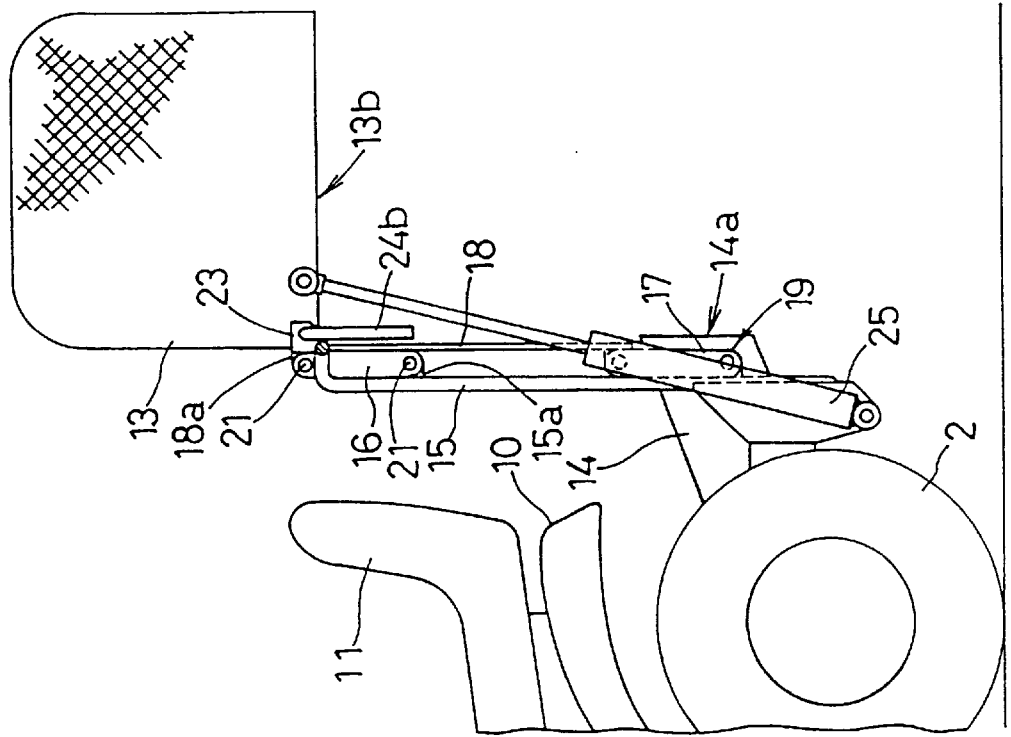
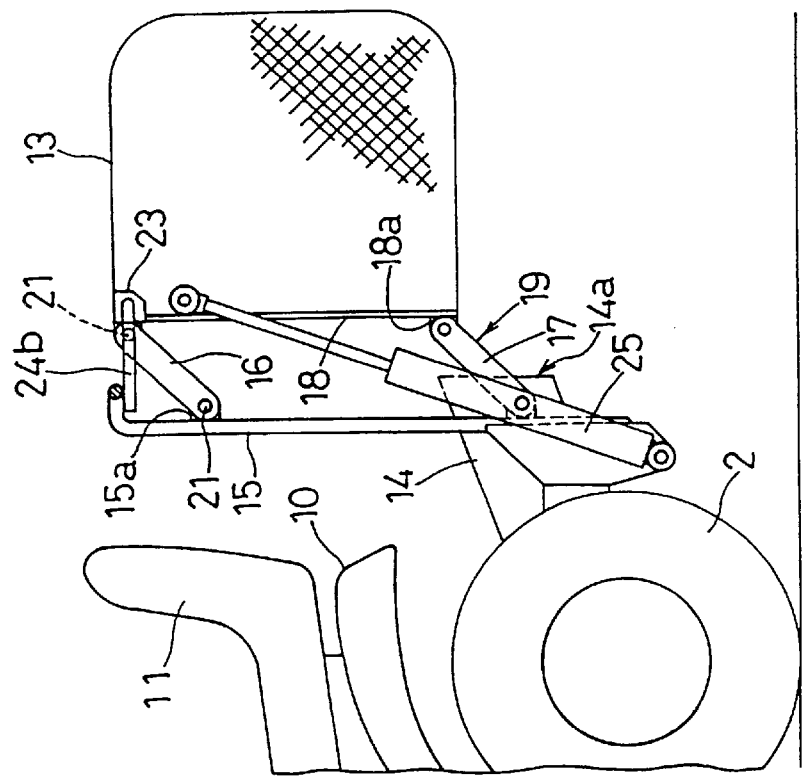

VERTICALLY MOVABLE GRASS CATCHER FOR A MOWER

BACKGROUND OF THE INVENTION

1. Field of the Invention

This invention relates to grass/lawn mower vehicles for cutting grass or lawn. More particularly, the invention relates to a grass/lawn mower vehicle having a mower unit attached to a vehicle body, and a grass catcher for collecting grass or lawn cut by the mower unit and transmitted through a duct.

2. Description of the Related Art

Conventionally, this type of grass/lawn mower vehicle has a grass catcher of well-known construction defining an opening in a front surface thereof opposed to the duct for receiving grass clippings transmitted through the duct and for discharging the grass clippings from the grass catcher. When the grass catcher collects and stores grass clippings; the opening is closed by a lid having an upper end thereof supported by an upper edge of the opening. The lid is pivotable about a transverse axis to open the opening. An end of the duct is inserted into a grass clippings inlet of the lid in a closed position. The grass catcher is connected in an upper front position thereof, to be pivotable about a transverse axis, to a frame fixed to the vehicle body. An actuator such as a hydraulic cylinder is provided for raising the rear end of the grass catcher, whereby the grass catcher pivots about the transverse axis. Thus, only the main body of the grass catcher is raised, leaving the lid in a suspended posture, to expose the opening for discharging grass clippings from the grass catcher to the ground.

With the conventional grass/lawn mower vehicle having the above construction, the grass catcher is raised only through a pivotal movement about the transverse axis to expose the opening. Consequently, the grass catcher assumes a relatively low discharge posture to discharge grass clippings. Where, for example, grass clippings are discharged to a trailer or the like, instead of being discharged simply to the ground, the grass catcher must be raised to a higher position above the ground to expose the opening. With the conventional grass/lawn mower vehicle allowing the grass catcher only a low posture for discharging grass clippings, it is difficult to discharge grass clippings from an elevated position. A mower vehicle is known, as disclosed in U.S. Pat. No. 4,487,007, in which a complicated link mechanism is employed to pull the duct rearward out of the lid of the grass catcher, then to move the grass catcher upward, and thereafter to raise the rear end of the grass catcher to expose the opening. Such a mower vehicle has a disadvantage of high manufacturing and maintenance costs because of the complicated link structure.

SUMMARY OF THE INVENTION

This invention has been made having regard to the state of the art noted above, and its object is to provide a simple dump structure for allowing a grass catcher to discharge grass clippings from an elevated position.

The above object is fulfilled, according to this invention, by a grass/lawn mower vehicle having a mower unit, and means for transporting grass clippings cut by the mower unit through a suitable duct, the vehicle comprising:

a grass catcher for collecting the grass clippings transported through the duct, the grass catcher having an opening formed in a wall thereof;

a lid for opening and closing the opening;

a horizontal axis for connecting the grass catcher and the lid to be pivotable relative to each other; and a control mechanism for raising the grass catcher relative to the vehicle and swinging the grass catcher about the horizontal axis, thereby allowing the grass catcher to dump the grass clippings from an elevated position, the control mechanism including link means having one end thereof connected to the vehicle, and the other end connected to the lid, and an actuator for moving the link means between a lower position and an upper position, and swinging the grass catcher when the link means is in the upper position.

According to this construction, when discharging grass clippings from the grass catcher, the link means is actuated to raise the lid and grass catcher to an elevated position, with the opening of the grass catcher remaining closed by the lid. Subsequently the grass catcher is swung about the horizontal axis to separate the opening of the grass catcher from the lid, thereby discharging the contents of the container through the opening. That is, the lid functions as part of the link type control mechanism, which allows the link means itself to have a simple construction.

The lid may support the grass catcher through the horizontal axis. Then, the grass catcher may be attached to the vehicle through a very simple mounting structure, resulting in the advantage of reduced manufacturing and maintenance costs.

In a preferred embodiment of this invention, the link means is in form of a parallelogram link mechanism including upper links each having one end thereof pivotally connected to the vehicle, and the other end pivotally connected to the lid, and lower links each having one end thereof pivotally connected to the vehicle, and the other end pivotally connected to the lid, the grass catcher being pivotably supported by the lid, the lid closing the opening of the grass catcher when the link means is moved from the lower position to the upper position. With this construction, the lid and grass catcher are maintained in the same posture by the parallelogram link mechanism i.e. the opening remains closed, during ascent. Only thereafter are the lid and grass catcher swung relative to each other to discharge grass clippings through the opening. This assures the grass clippings being discharged from an elevated position.

The actuator may comprise a fluid pressure cylinder having one end thereof connected to the vehicle, and the other end connected to the grass catcher. Then, this cylinder vertically displaces the parallelogram link mechanism, and thus the lid, through the grass catcher, and also swings the grass catcher about the horizontal axis. Thus, the single cylinder is adequate to perform the overall operation.

In another preferred embodiment of the invention, the mower vehicle further comprises restrictors for restricting ascent of the grass catcher, thereby converting a raising force of the actuator applied to the grass catcher to a swinging force applied to the grass catcher. When the grass catcher is raised along with the lid to a height determined by the restrictors, a further ascent of the grass catcher is prevented by the restrictors, whereupon the grass catcher begins to swing about the horizontal axis. Thus, the restrictors preventing ascent of the grass catcher produce a pivotal movement of the grass catcher. The restrictors may comprise extensions from ends of the horizontal axis, which further simplifies the construction of the lifting and dumping mechanism of this invention.

To collect grass clippings during a grass cutting operation, the lid may define a grass clipping inlet, with the duct extending into the grass clipping inlet when the link means is in the lower position. In this case, the control mechanism is operable to raise the grass catcher obliquely upward first to avoid an interference between the grass clipping inlet and the duct. The obliquely upward displacement of the grass catcher may be achieved simply, for example, through the parallelogram link mechanism noted above.

Other features and the advantages of this invention will be apparent from the following description of the embodiments to be taken with reference to the drawings.

BRIEF DESCRIPTION OF THE DRAWINGS

FIG. 6A is a side view showing the grass catcher being raised.

FIG. 6B is a side view showing the grass catcher in an uppermost position.

DESCRIPTION OF THE PREFERRED EMBODIMENTS

Figure 1:
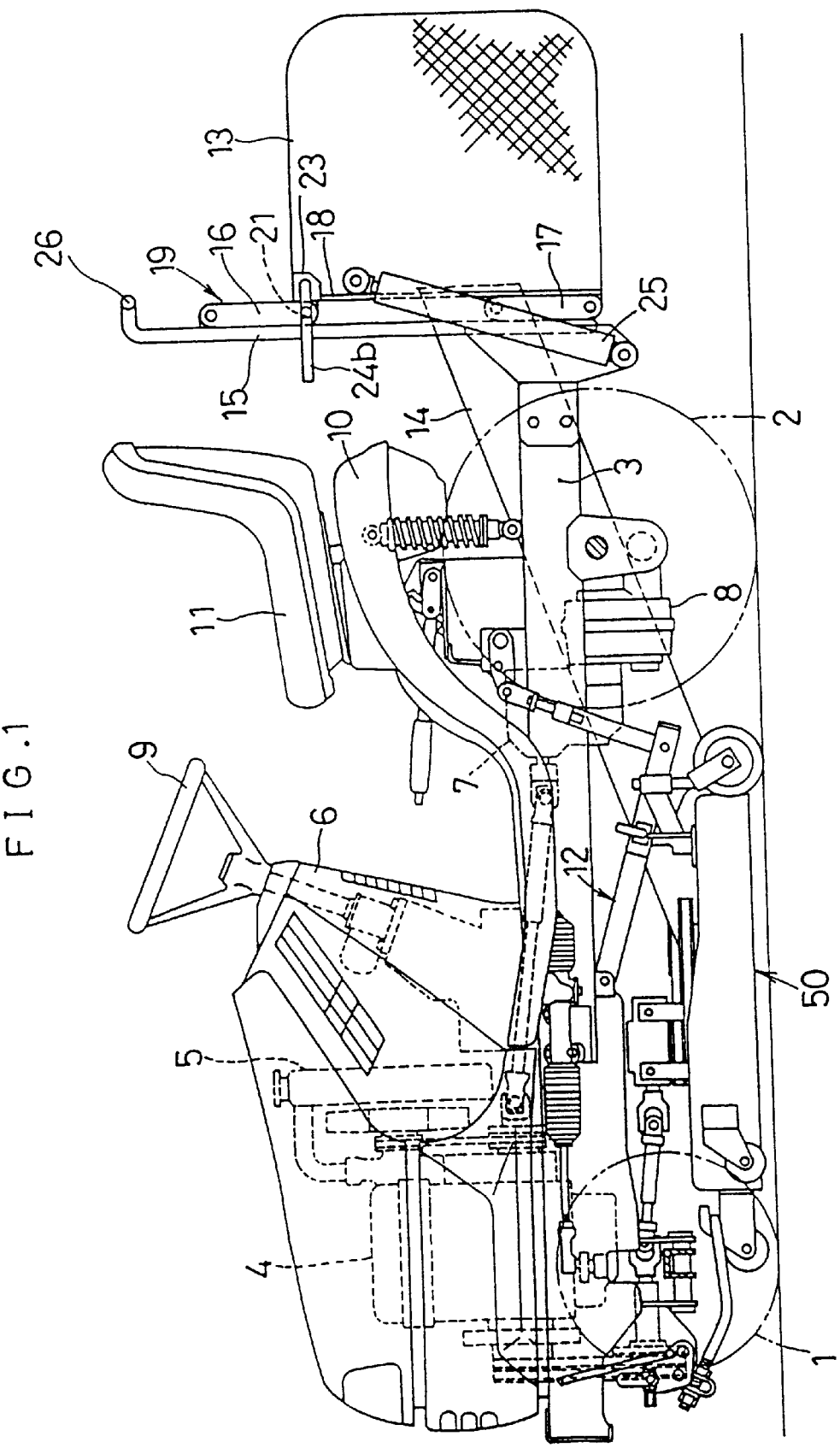
FIG. 1 is a side elevation of a riding lawn tractor which is one example of grass/lawn mower vehicles.
Figure 2:
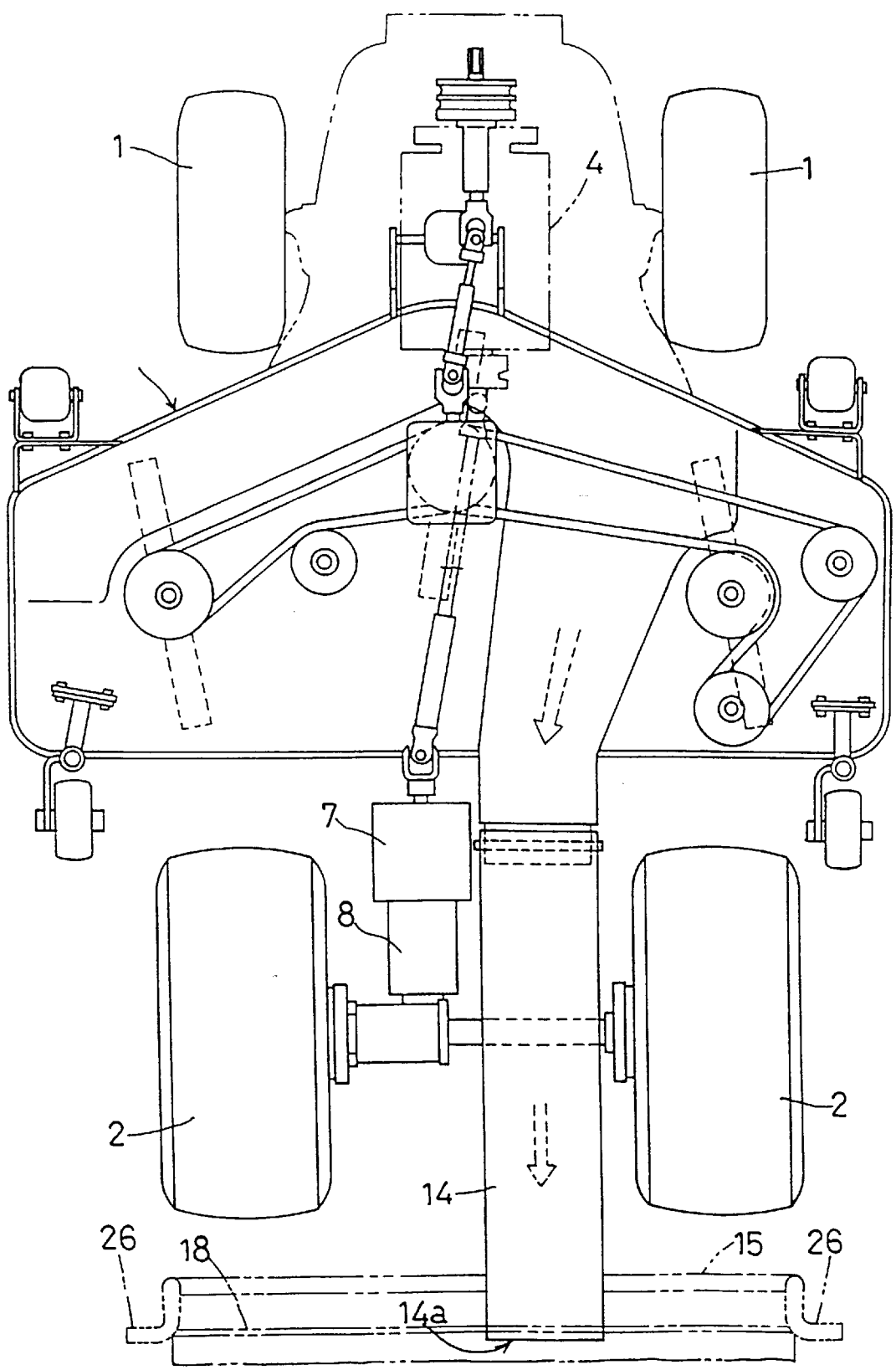
FIG. 2 is a partial plan view of the lawn tractor.
Figure 3:
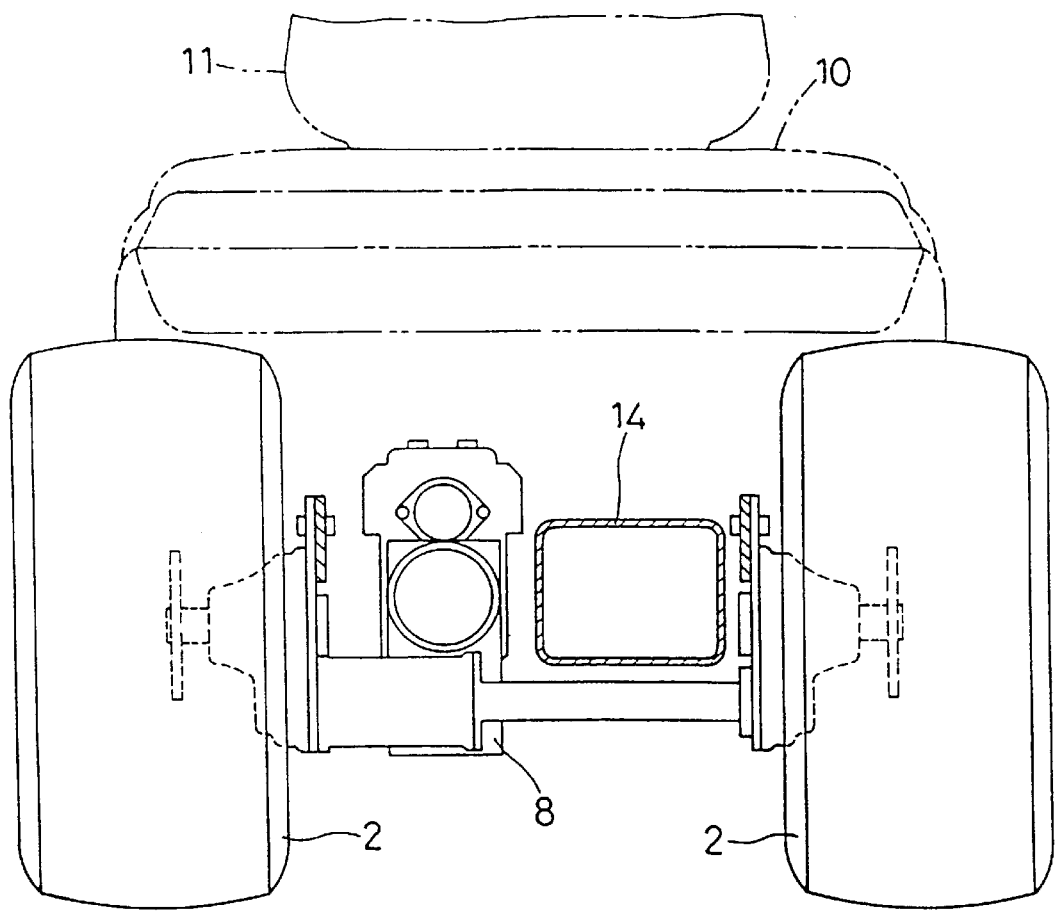
FIG. 3 is a partial rear view of the lawn tractor.

FIGS. 1, 2 and 3 show a lawn tractor which is one example of grass/lawn mower vehicles. A pair of right and left front wheels 1 and a pair of right and left rear wheels 2 acting as drive wheels support a body frame 3 formed of sheet metal. The body frame 3 supports a motor section disposed on a front portion thereof and including an engine 4 and a radiator 5. A steering column 6 is disposed on an intermediate portion of the body frame 3, and an HST 7 and a gear type transmission 8 in a rear portion of the body frame 3. A steering wheel 9 is attached to an upper end of steering column 6. A rear wheel fender 10 extends to the vicinity of steering column 6 and forms a driver's section, with a driver's seat 11 mounted on the fender 10. A mower unit 50 acting as a grass cutting implement is suspended from the body frame 3 between front wheels 1 and rear wheels 2 to be vertically movable through a link mechanism 12.

A grass catcher 13 is attached to the rear end of body frame 3. Grass clippings cut by the mower unit 50 are transported through a grass transport duct 14 to the grass catcher 13 to be collected therein. The grass catcher 13 has a lid 18 disposed in the front thereof, which is connected to a frame 15 fixed to the rear end of body frame 3 through a pair of right and left upper links 16 and a pair of right and left lower links 17. The links 16 and 17 are connected to the fixed frame 15 to be vertically pivotable through brackets 15a attached to the fixed frame 15 and through link pins 21 extending horizontally and transversely. The links 16 and 17 are connected also to the lid 18 to be vertically pivotable through brackets 18a attached to the lid 18 and through the link pins 21. The fixed frame 15, links 16 and 17, and lid 18 constitute a parallelogram link mechanism 19. The parallelogram link mechanism 19 and a hydraulic cylinder 25 constitute a control mechanism for raising the grass catcher 13 relative to the body frame 3 and swinging the grass catcher 13 about a pivotal axis 24a to allow the grass catcher 13 to dump its contents from an elevated position.

Figure 4:
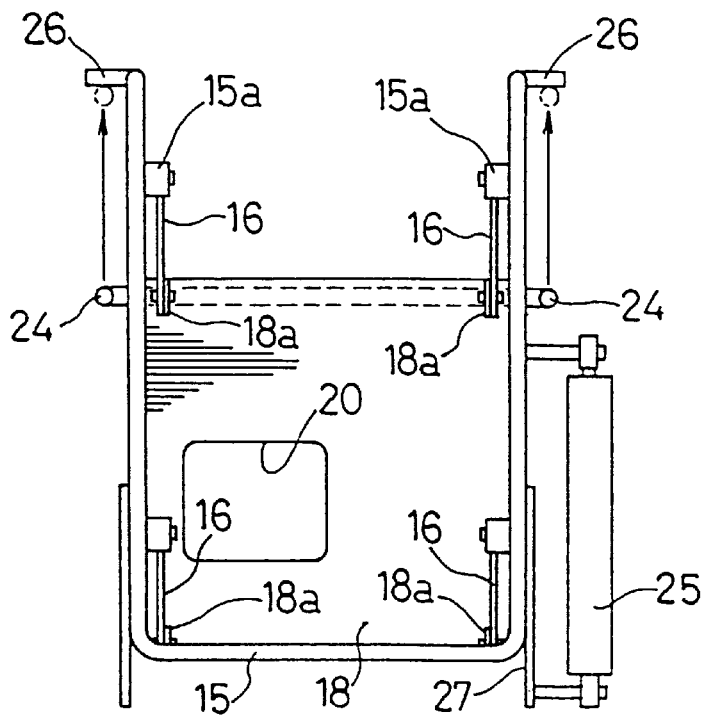
FIG. 4 is a front view of a grass catcher and adjacent components.
Figure 5:
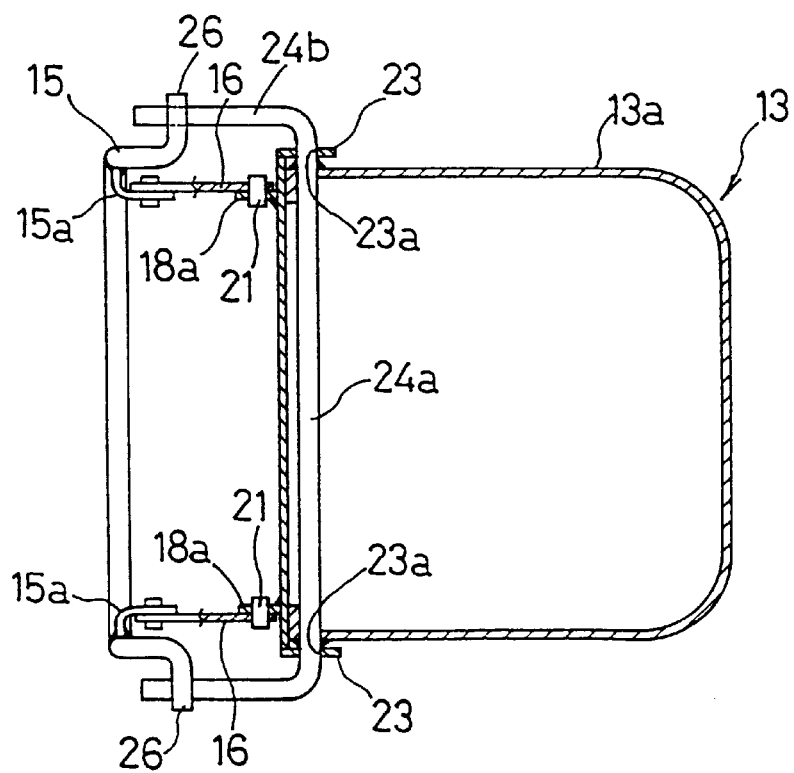
FIG. 5 is a plan view showing a connection of the grass catcher, a lid and a fixed frame.

As shown in FIG. 4, the lid 18 defines a grass clipping inlet 20 in a vertically and transversely intermediate position thereof for receiving a grass clipping discharge opening 14a formed at the rear end of duct 14. Further, as shown in FIG. 5, the lid 18 has support brackets 23 attached to the other side thereof than where the brackets 18a are attached. The support brackets 23 define bores 23a penetrated by the pivotal axis 24a of grass catcher 13. The pivotal axis 24a extends horizontally and transversely through the grass catcher 13, and is fixed to a container frame 13a of the grass catcher 13. Thus, the grass catcher 13 is pivotably supported by the lid 18 through the pivotal axis 24a acting as a horizontal axis. The pivotal axis 24a has opposite ends thereof bent approximately 90 degrees to extend toward the fixed frame 15. These extensions act as restrictors 24b. The grass catcher 13 is formed of a relatively strong resin, and defines vent meshes in substantially entire wall surfaces thereof excluding the container frame 13a.

The fixed frame 15 is a U-shaped frame formed of pipe, with free ends thereof bent 90 degrees rearward and then extending laterally outward. These opposite free ends act as stoppers 26 for contacting the restrictors 24b of grass catcher 13 raised by the hydraulic cylinder 25 as described hereinafter, to prevent a further ascent of the lid 18 and grass catcher 13. The hydraulic cylinder 25 acting as an actuator for raising the grass catcher 13 rearward and upward has one end thereof connected to a bracket 27 securing the fixed frame 15 to the rear end of body frame 3, and the other end connected to a bracket attached to the left side of grass catcher 13 adjacent the pivotal axis 24a.

During a normal grass cutting operation, the hydraulic cylinder 25 is maintained at its shortest to place the grass catcher 13 in a lowermost position at a minimum distance to the fixed frame 15. In this state, the rear end of duct 14 is inserted into the grass clipping inlet 20 of lid 18, and the opening 13b at the front of grass catcher 13 is closed by the lid 18 in vertical posture, to allow grass clippings to be collected in the grass catcher 13.

For discharging grass clippings from the grass catcher 13, the driver turns on a discharge control switch (not shown) disposed in the driver's section. Then, the hydraulic cylinder 25 extends to move the grass catcher 13 obliquely rearward and upward with the upper and lower links 16 and 17 pivoting rearward and upward. The duct 14 slides out of the grass clipping inlet 20 of lid 18 suspended in vertical posture. With a further extension of hydraulic cylinder 25, as shown in FIG. 6A, the restrictors 24b contact the stoppers 26 from below. With the stoppers 26 maintaining the contact, a further extension of hydraulic cylinder 25 swings the rear end of grass catcher 13 upward about the pivotal axis 24a. The lid 18 maintains the suspended posture since it is not raised directly by the hydraulic cylinder 25 but is connected to the grass catcher 13 to be pivotable about the pivotal axis. With the lid 18 remaining in the fixed suspended posture, the opening 13b is exposed as the rear end of grass catcher 13 is raised. Consequently, when the hydraulic cylinder 25 is extended to a maximum, as shown in FIG. 6B, the grass catcher 13 is raised to a position having the opening 13b facing straight downward.

Next, modified structures of duct 14 will be described briefly.

Figure 7:
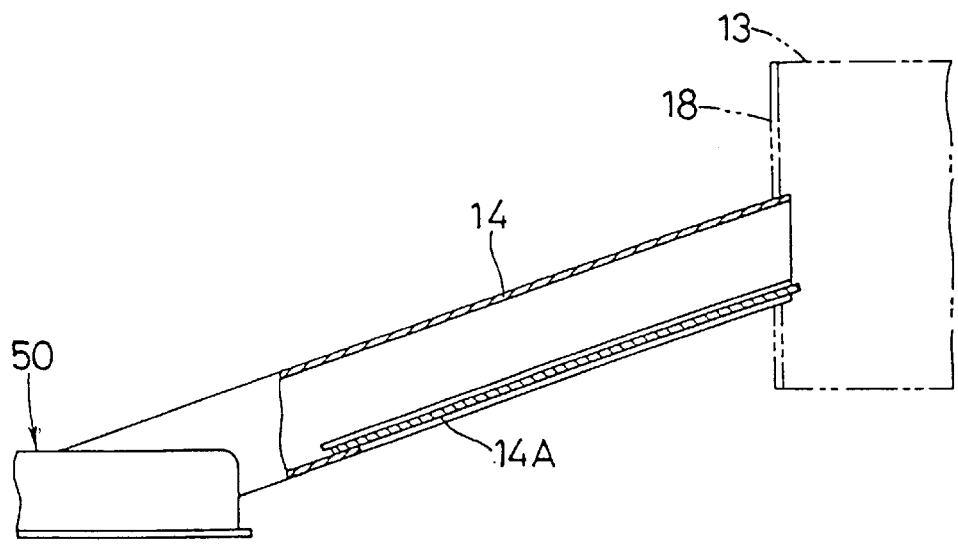
FIG. 7 is a side view, partly in section, of a modified duct structure.
Figure 8:
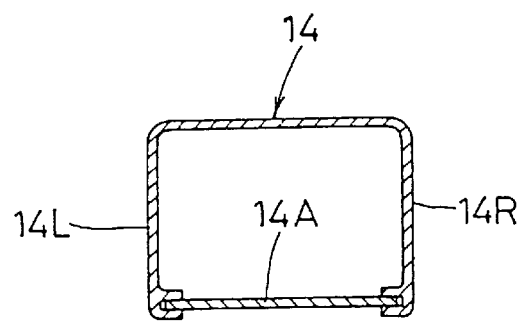
FIG. 8 is a front view, in vertical section, of the modified duct structure.

FIGS. 7 and 8 show a structure for opening the duct 14 when clogged with grass clippings, in order to remove the grass clippings. The duct 14 has a detachable bottom plate 14A which is slidable along the direction of grass clipping transport relative to right and left side surfaces 14R and 14L of the duct 14. When the duct 14 is clogged in an intermediate position by grass clippings, the grass catcher 13 is detached from the duct 14, and the bottom plate 14A is withdrawn rearward. In this way, the substantially entire lower plane of duct 14 is opened for allowing the clogging grass clippings to fall by gravity or to be removed manually.

Figure 9:
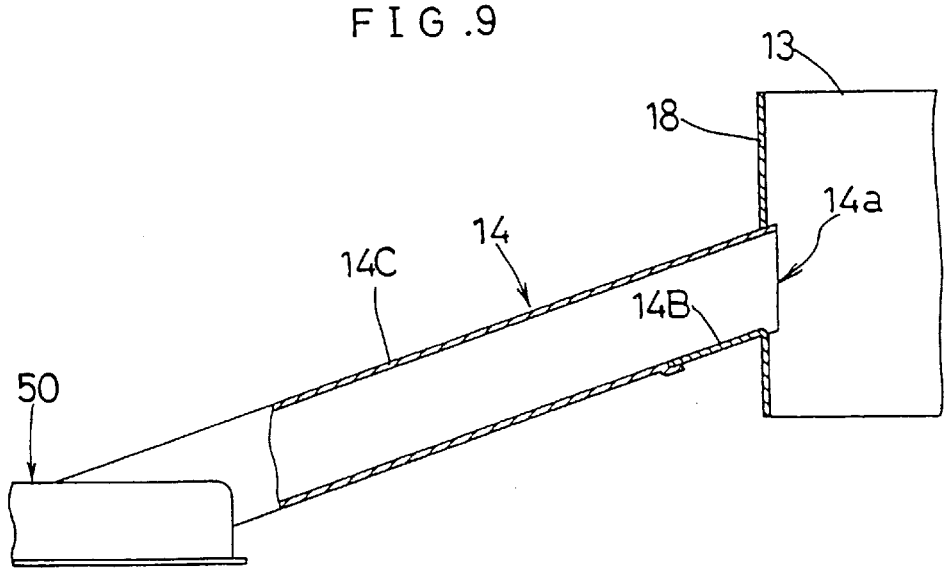
FIG. 9 is a side view, partly in section, of another modified duct structure.

As shown in FIG. 9, the duct 14 may have a rear end portion 14B of a bottom plate formed separately from a main duct body 14C and integrated with the lid 18 of grass catcher 13. With this construction, when the grass catcher 13 is raised, the rear bottom plate portion 14B becomes detached from the main duct body 14C. Clogging grass clippings may be removed without necessitating the trouble of manually detaching the bottom plate 14B.

What is claimed is:

1. A grass/lawn mower vehicle having a mower unit, and means for transporting grass clippings cut by the mower unit through a suitable duct, said vehicle comprising:

a grass catcher for collecting the grass clippings transported through said duct, said grass catcher having an opening formed in a wall thereof;

a lid for opening and closing said opening;

a horizontal axis for connecting said grass catcher and said lid to be pivotable relative to each other; and a control mechanism for raising said grass catcher and said lid relative to said vehicle and for swinging said grass catcher about said horizontal axis which connects said grass catcher and said lid, thereby allowing said grass catcher to dump the grass clippings from an elevated position, said control mechanism including link means having one end thereof connected to said vehicle, and the other end connected to said lid, and an actuator for moving said link means between a lower position and an upper position, and swinging said grass catcher when said link means is in said upper position.

2. A grass/lawn mower vehicle as defined in claim 1, wherein said lid supports said grass catcher through said horizontal axis.

3. A grass/lawn mower vehicle as defined in claim 2, further comprising restrictors for restricting ascent of said grass catcher, thereby converting a raising force of said actuator applied to said grass catcher to a swinging force applied to said grass catcher.

4. A grass/lawn mower vehicle as defined in claim 1, wherein said lid defines a grass clipping inlet, said duct extending into said grass clipping inlet when said link means is in said lower position.

5. A grass/lawn mower vehicle as defined in claim 4, wherein said control mechanism is operable to raise said grass catcher obliquely upward first to avoid an interference between said grass clipping inlet and said duct.

6. A grass/lawn mower vehicle having a mower unit, and means for transporting grass clippings cut by the mower unit through a suitable duct, said vehicle comprising:

a grass catcher for collecting the grass clippings transported through said duct, said grass catcher having an opening formed in a wall thereof;

a lid for opening and closing said opening;

a horizontal axis for connecting said grass catcher and said lid to be pivotable relative to each other, wherein said lid supports said grass catcher through said horizontal axis; and a control mechanism for raising said grass catcher relative to said vehicle and swinging said grass catcher about said horizontal axis, thereby allowing said grass catcher to dump the grass clippings from an elevated position, said control mechanism including link means having one end thereof connected to said vehicle, and the other end connected to said lid, wherein said link means is in the form of a parallelogram link mechanism including upper links each having one end thereof pivotally connected to said vehicle, and the other end pivotally connected to said lid, and lower links each having one end thereof pivotally connected to said vehicle, and the other end pivotally connected to said lid, said grass catcher being pivotally supported by said lid, and said control mechanism also including an actuator for moving said link means between a lower position and an upper position, and swinging said grass catcher when said link means is in said upper position, said lid closing said opening of said grass catcher when said link means is moved from said lower position to said upper position.

7. A grass/lawn mower vehicle as defined in claim 6, wherein said actuator comprises a fluid pressure cylinder having one end thereof connected to said vehicle, and the other end connected to said grass catcher, for vertically displacing said parallelogram link mechanism through said grass catcher.

8. A grass/lawn mower vehicle having a mower unit, and means for transporting grass clippings cut by the mower unit through a suitable duct, said vehicle comprising:

a grass catcher for collecting the grass clippings transported through said duct, said grass catcher having an opening formed in a wall thereof;

a lid for opening and closing said opening;

a horizontal axis for connecting said grass catcher and said lid to be pivotable relative to each other, wherein said lid supports said grass catcher through said horizontal axis;

a control mechanism for raising said grass catcher relative to said vehicle and swinging said grass catcher about said horizontal axis, thereby allowing said grass catcher to dump the grass clippings from an elevated position, said control mechanism including link means having one end thereof connected to said vehicle, and the other end connected to said lid, and an actuator for moving said link means between a lower position and an upper position, and swinging said grass catcher when said link means is in said upper position; and restrictors for restricting ascent of said grass catcher, thereby converting a raising force of said actuator applied to said grass catcher to a swinging force applied to said crass catcher, wherein said restrictors comprise extensions from ends of said horizontal axis.

9. A grass/lawn mower vehicle having a mower unit, and means for transporting grass clippings cut by the mower unit through a suitable duct, said vehicle comprising:

a grass catcher for collecting the grass clippings transported through said duct, said grass catcher having an opening formed in a wall thereof;

a lid for opening and closing said opening;

a horizontal axis for connecting said grass catcher and said lid to be pivotable relative to each other; and a control mechanism for swinging said grass catcher about said horizontal axis which connects said grass catcher and said lid until said opening faces downward after raising said grass catcher and said lid relative to said vehicle with said opening closed by said lid, thereby allowing said grass catcher to dump the grass clippings from an elevated position, said control mechanism including link means having one end thereof connected to said vehicle, and the other end connected to at least one of said lid and said grass catcher, and an actuator for moving said link means between a lower position and an upper position, and swinging said grass catcher when said link means is in said upper position.

* * * * *